Sept. 8, 1964 F. M. WHITACRE 3,147,619
FLOAT POSITION INDICATOR
Filed Nov. 17, 1961 2 Sheets-Sheet 1
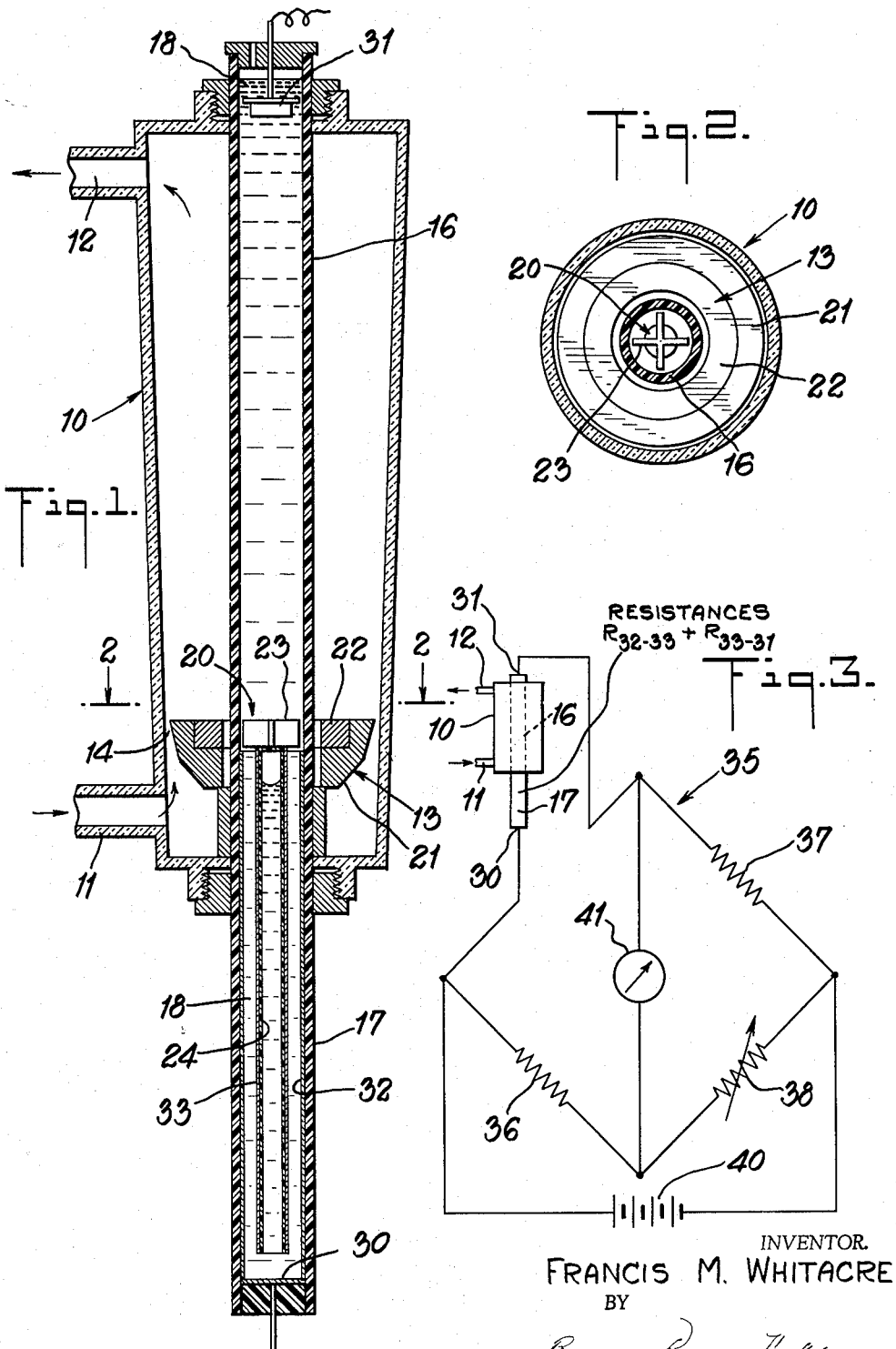
INVENTOR.
FRANCIS M. WHITACRE
BY
Burgess, Ryan - Hicks
ATTORNEYS

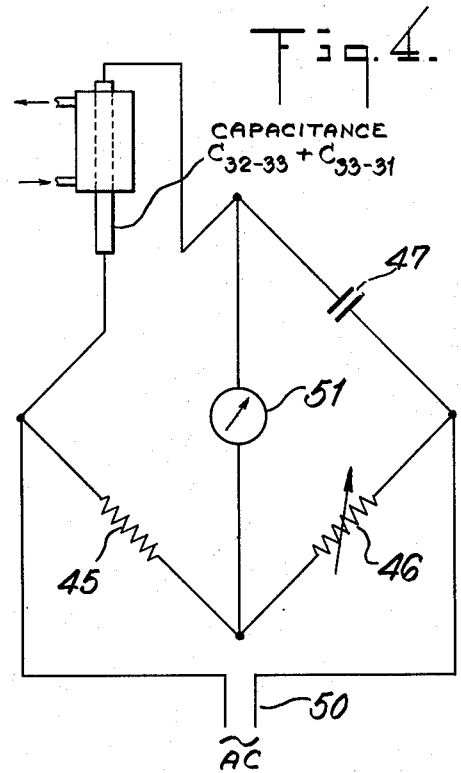

United States Patent Office 3,147,619
Patented Sept. 8, 1964

3,147,619
FLOAT POSITION INDICATOR
Francis M. Whitacre, 148 Shoreview Road,
Manhasset, N.Y.
Filed Nov. 17, 1961, Ser. No. 152,996
6 Claims. (Cl. 73—209)

The present invention relates to a float position indicator, and although the invention has a wide range of utility, it is particularly adapted for use in connection with an area type flow meter.

In a flow meter of the area type, a float in a tapering meter tube through which the liquid to be metered flows, rises and falls according to the rate of flow of the liquid. In some known types of flow meters, the characteristics of an electric circuit are varied in accordance with the changes in the position of the float, and these characteristics are translated into flow rate indications.

One object of the present invention is to provide a new and improved flow meter of the general type described, which is highly sensitive and accurate in operation, which affords high stability to the float and which, therefore, affords steady meter readings, which is free from bearings, springs, and other such movable elements liable to create undesirable friction and/or readily susceptible to wear, misalignment and misadjustment, which is free from eccentric loadings and consequently is nicely balanced hydraulically, which has a minimum of moving parts, which is free from bulky meter tube attachments, and which is comparatively simple in construction, simple to install and simple to operate.

In accordance with certain features of the present invention, the flow meter comprises a vertical metering tube in the flow path of the liquid whose rate is to be measured, and a metering float in said tube movable vertically therein in accordance with the rate of flow of the liquid through said tube, so that the elevation of the float is a direct measure of the rate of flow through the tube. Along the metering tube is an auxiliary tube containing a still liquid and an auxiliary float in said tube. The two floats contain respective magnetic bodies, one of which is a magnet, the other body being in the magnetic field of said magnet, so as to be coerced by said magnet. The auxiliary float is hydraulically balanced in the still liquid so as to be moved vertically through the still liquid and along the auxiliary tube by magnetic force, in accordance with the movement of the metering float along the metering tube. The level of the auxiliary float will, therefore, correspond to that of the metering float. The position of this auxiliary float is electrically translated into indications of liquid flow rates.

In accordance with the more specific aspects of the present invention, the auxiliary tube extends inside the metering tube and the metering float is in the form of a ring encircling said auxiliary tube and guided by and along said auxiliary tube as said float moves up and down in response to fluctuations in the liquid flow rate. As a further feature, the two magnetic bodies are so relatively polarized as to maintain the auxiliary float by magnetic action centered in the auxiliary tube.

Various other objects, features and advantages of the invention are apparent from the following description and from the accompanying drawings, in which:

FIG. 1 is a longitudinal section through a flow meter in which variations in resistances in a circuit are employed to determine the position of the metering float and therefore of the rate of flow of the liquid being metered, and shows one embodiment of the present invention.

FIG. 2 is a transverse section of the flow meter of FIG. 1 taken along the lines 2—2 of FIG. 1.

FIG. 3 is a wiring diagram of an electric circuit which is employed in connection with the embodiment of FIGS. 1 and 2 to translate the position of the metering float in this embodiment into corresponding liquid flow rates, and FIG. 4 is a wiring diagram which usese variations in capacitance in an electric circuit to translate the position of the metering float in a flow meter into corresponding readings of flow rate.

Referring to FIGS. 1 and 2 of the drawings, there is shown an outer vertical metering tube 10, which may be constructed of glass, plastic or metal, and which has an inlet 11 at its lower end and an outlet 12 at its upper end for the liquid whose flow rate is to be measured. The metering tube 10 is of circular cross-section and slightly tapers towards its lower end. In the metering tube 10 is a float 13 in the form of a plummet, free to move vertically in said tube and having an external circular periphery smaller than the internal circular periphery of the metering tube 10 to define between the float and the inside wall of the tube an annular space 14 serving as a constriction for the liquid in its upward flow. The liquid entering the lower end of the tube 10 through the inlet 11 causes the float 13 to rise and passes upwardly at some point through the annular constriction 14. This action of the flowing liquid causes the float 13 to rise until the pressure drop across the annular constriction 14 is just sufficient to support the float 13. Therefore, at any particular rate of flow, the float 13 assumes a definite position in the metering tube 10. As the flow increases, the float 13 rises, thereby increasing the area of the annular constriction 14. Consequently, the elevation of the float 13 becomes a direct measure of the rate of flow through the metering tube 10.

The construction so far described is known. However, in the known type of flow meter of the area type described, in order to maintain the metering float 13 centered in the metering tube 10, small diagonal slots are provided in the head of the float, causing the float to rotate slowly. This rotation of the float 13 tends to maintain the float in center position with respect to the metering tube 10. In accordance with the present invention, it is possible in a manner to be described to properly center the metering float 13 with respect to the metering tube 10 without the provision of the small diagonal slots or similar expedients now employed for rotating the float.

As an important feature of the present invention, there is provided a small inner auxiliary tube 16 extending vertically and centrally through the metering tube 10 and having its lower end section 17 projecting below the lower-most position of the metering float 13. The inner tube 16 is of cylindrical form and contains a still liquid 18 of low viscosity such as water, alcohol, toluene or xylene. Floating in the still liquid 18 is an auxiliary float 20. This float 20 has an average density which in relation to the density of the still liquid 18 is such that the ratio between the density of the still liquid and the average density of the float is close to 1. In the case where the float 20 normally moves from bottom to top, as in the specific embodiment of FIGURES 1 and 2 shown, this ratio is less than 1. In the case where the float 20 normally moves from top to bottom, then the ratio of the density of the still liquid 18 to the average density of the float would be greater than 1. In any case, this ratio differs from 1 only to a slight degree, so that the float 20 is substantially weightless and will require very small magnetic forces to move it vertically in the inner tube 16.

The metering float 13 is in the form of a ring with a center opening through which the inner tube 16 extends. The float 13 has a close slide fit around the inner tube 16 to permit it to move freely along said tube in accordance with variations in the flow of the liquid passing through the outer metering tube 10 while maintaining the float 13 centered in said metering tube and therefore, the inner and outer peripheries of the annular constriction 14 concentric.

If the materials from which the float 13 and the inner tube 16 are made are such as to tend to bind the float 13 in its vertical movement to said inner tube when the float embraces the tube too closely, then a clearance may be provided between the float and the tube to avoid this binding action. Under these conditions, the float 13 may be provided with diagonal slots to cause said float to rotate as the liquid passes by and to maintain thereby said float centered in relation to the metering tube 10, as in the manner of conventional rotameters.

As a feature of the present invention, means are provided for moving the auxiliary float 20 vertically by magnetic action in accordance with the vertical movement of the metering float 13. For that purpose, either the entire metering float 13 constitutes a magnet or the float may comprise an annular body 21 of any suitable non-magnetic material having a recess to receive a permanent ring magnet 22, as shown. The float 20 includes a head 23 of magnetic material in the magnetic field of the magnet 22 and a tube 24 depending therefrom and extending vertically into the still liquid 18. The head 23 is susceptible of being attracted by a magnet, and either constitutes a magnet or is made of magnetic substance having no coercive force. The head 23 desirably is of magnetic substance such as soft iron having no coercive effect and to assure centering of the float 20 in the tube 16, it is desirable that the polarization of said head be emphasized and symmetrized by providing said head with radiating polar sections and that the magnet 22 be symmetrically polarized to assure the centering of the float head 23 in relation to the magnet 22 and therefore to the tube 16 by magnetic action.

The tube 24 may be of glass, plastic or non-magnetic metal, such as aluminum or stainless steel, and the proper balance of the float 23 in the still liquid 18 to attain a ratio of the density of the still liquid to the average density of the float of about 1, is obtained by sealing the upper end of the tube while the lower end remains open, to trap a gas or air bubble in the upper end of the tube, and by varying the amount of trapped gas in the tube to vary the buoyancy of the float.

The magnetic bodies 22 and 23 have enough magnetic attraction, so that as the metering float 13 moves vertically in the outer metering tube 10 in accordance with the flow therethrough of the liquid to be metered, the auxiliary float 20 moves correspondingly by magnetic action vertically in the inner tube 16 to remain at the same level as the metering float.

Incorporated into the flow meter of FIGS. 1 and 2 is an electric circuit loop or network having resistances which are varied by the movement of the metering float 20. These variations in resistances are translated into actual readings of liquid flow rates. In the specific form shown, the circuit loop comprises a terminal or electrode 30 at the bottom of the inner tube 16 and a terminal or electrode 31 at the upper end of said tube extending into the still liquid 18 as to be in electrical contact with said liquid. The still liquid 18 is electrically conductive and for that purpose, may contain a soluble electrolyte therein, such as sodium phosphate, in case the main body of still liquid is not sufficiently electrically conductive. The inner tube 16 is also made conductive for connection to the bottom electrode 30. If the inner tube 16 is made of metal, then this tube having a direct connection to the bottom electrode 30 would afford the necessary conductivity. In that case, the inner surface of the inner tube 16 above the floats 13 and 20 in their lowermost positions is insulated by a lining, as for example, of plastic material.

If the inner tube 16 is of glass or plastic, as in the specific form shown, then the inside of this tube is lined, coated or plated with a conductive metal film 32, as for example, produced by metal deposit, such as by aluminum vacuum deposit. This metal film 32 extends from the electrode 30 upwardly to a point near the floats 13 and 20 in their lowermost positions.

Similarly, the float tube 24 is made electrically conductive, and for that purpose, it is either made of metal, such as aluminum, or if it is made of plastic or glass, as shown, then the outside of this tube is coated, lined or plated with a conductive metal film 33.

With the resistances set up as shown, there is a circuit loop which comprises a resistance between the conductive film 32 directly connected to the lower electrode 30 and the conductive film 33 through the conductive still liquid 18, designated herein as $R_{32-33}$. There is also a resistance extending from the upper end of the film 33 and along the length of still liquid 18 between the upper end of this film and the upper electrode 31 designated herein as $R_{33-31}$. The two resistances $R_{32-33}$ and $R_{33-31}$ are in series and as the auxiliary float 20 moves up and down, the sum of these resistances varies. As the auxiliary float 20 rises, the resistance $R_{32-33}$ increases and the resistance $R_{33-31}$ decreases, but the rate of increase of the resistance $R_{32-33}$ is less than the rate of decrease of the resistances $R_{33-31}$, so that as the float rises, the sum of these resistances decreases.

The variation in the sum of the two resistances $R_{32-33}$ and $R_{33-31}$ in response to the vertical movements of the auxiliary float 20, is translated into readings or indications corresponding to the rate of flow of the liquid being measured. FIG. 3 shows in simplified form an electric circuit which may be employed for that purpose. This circuit is in the form of a Wheatstone bridge 35 having in series as arms two fixed resistances 36 and 37, the resistances $R_{32-33}$ and $R_{33-31}$ through the flow meter, and a manually controllable variable resistance 38 for balancing the Wheatstone bridge, so that no current flows therethrough when the float 13 is in its lowermost position. The Wheatstone bridge is energized from a battery 40 and an ammeter 41 across the Wheatstone bridge is responsive to variations in resistance across the flow meter, and therefore can be calibrated to indicate the rate of flow of liquid through the flow meter.

As an alternative to the Wheatstone bridge circuit of FIG. 3, a small alternating current, as for example, of 60 cycles per second, may be passed through the flow meter between the electrodes 30 and 31 and a sensitive voltmeter may be connected across these electrodes responsive to changes in the sum of the resistances $R_{33-33}$ and $R_{33-31}$ to indicate the rate of flow of the liquid through the flow meter. Alternating current may be desirable in certain cases to prevent electrolytic corrosion between metallic surfaces.

The capacitance between two conductors varies directly with the dielectric constant of the medium between the conductors and the area with which the conductors face each other. It also varies inversely with the distance between the conductors. Therefore, in a flow meter similar to that shown in FIGS. 1 and 2, if the still liquid 18 in the inner tube 16 is a dielectric liquid, such as xylene or an alcohol, according to the temperature to which the liquid is to be subjected, there will be formed a condenser comprising the metal film 32 and the metal film 33 separated by the intervening dielectric liquid in the inner tube 16, and having a capacitance designated herein as $C_{32-33}$ and a condenser comprising the metal film 33 and the upper electrode 31 separated by the still intervening dielectric liquid in the inner tube and having a capacitance designated herein as $C_{33-31}$. The sum of these two capacitances $C_{32-33}$ and $C_{33-31}$ connected in series can be measured to indicate the rate of flow of liquid through the flow meter. The construction of a flow meter responsive to variations in capacitance may be similar to that shown in FIGS. 1 and 2, except that the film 33 may be on the inside of the float tube 24, or one or both of the films 32 and 33 may be coated with a plastic to prevent short circuiting across the films 32 and 33.

FIG. 4 shows a Wheatstone bridge similar to that shown in FIG. 3 and responsive to the variations in the sum of capacitances $C_{32-33}$ and $C_{33-31}$. In this Wheatstone bridge, there is a fixed resistance 45, a manually controllable balancing resistance 46 and a fixed condenser 47 in the respective arms of the bridge. The condensers in the flow meter having the capacitances $C_{32-33}$ and $C_{33-31}$ as described are connected into the fourth arm of the bridge. The Wheatstone bridge is energized from a source 50 of alternating current and an ammeter 51 across the Wheatstone bridge responsive to changes in capacitance across the flow meter can be calibrated to indicate the rate of flow through the flow meter.

While the invention has been described with particular reference to specific embodiments, it is to be understood that it is not to be limited thereto but is to be construed broadly and restricted solely by the scope of the appended claims.

What is claimed is:

1. A flow meter of the area type comprising a metering tube through which the fluid whose rate of flow is to be measured is adapted to flow in a direction along said tube, a metering float in said tube movable therein along said tube and including a magnetic body, means for positioning said float in said tube automatically according to the rate of flow through said tube, whereby the position of the float along said tube is a measure of the rate of flow through said tube, an auxiliary tube of still liquid extending inside and along said metering tube and located in position to maintain said still liquid out of contact with the fluid which passes through said metering tube, said magnetic body encircling said auxiliary tube, an auxiliary float located in said auxiliary tube in said still liquid and including a magnetic body, said auxiliary float being in free float position in said still liquid entirely surrounded by said still liquid, one of said magnetic bodies constituting a magnet, the other magnetic body being in the magnetic field of said magnet and being magnetically coerced thereby, said magnet being strong enough to cause said auxiliary float to move by magnetic attraction abreast of said main float along said direction, and means for translating the variations in the position of said auxiliary float in said auxiliary tube automatically into corresponding variations in the characteristics of an electric current, and comprising an electric circuit for said electric current, said electric circuit including a conductor carried by said auxiliary float for movement therewith and in electrical communication with said still liquid, and a fixed terminal in electrical communication with the still liquid and located beyond said conductor in position to cause the distance along said auxiliary tube and along said still liquid between said terminal and said conductor to vary as the auxiliary float moves along said auxiliary tube, said electric circuit also including said still liquid between said terminal and said conductor, whereby variations in the characteristics of the electric current in said circuit is created by the movements of said auxiliary float in said still liquid.

2. A flow meter of the area type as described in claim 1, wherein said still liquid is electrically conductive to constitute a resistance in said circuit, whereby the resistance of the still liquid between said terminal and said conductor varies as the position of the auxiliary float varies, causing thereby the resistance of said circuit to vary.

3. A flow meter of the area type as described in claim 1, wherein said still liquid is a dielectric, whereby the capacitance of the still liquid between said terminal and said conductor varies as the position of the auxiliary float varies, causing thereby the capacitance of said circuit to vary.

4. A flow meter of the area type comprising a metering tube through which the fluid whose rate of flow is to be measured is adapted to flow in a direction along said tube, a metering float in said tube movable therein along said tube and including a magnetic body, means for positioning said float in said tube automatically according to the rate of flow through said tube, whereby the position of the float along said tube is a measure of the rate of flow through said tube, an auxiliary tube of still liquid extending inside and along said metering tube and located in position to maintain said still liquid out of contact with the fluid which passes through said metering tube, said magnetic body encircling said auxiliary tube, an auxiliary float located in said auxiliary tube in said still liquid and including a magnetic body, said auxiliary float being in free float position in said still liquid entirely surrounded by said still liquid, one of said magnetic bodies constituting a magnet, the other magnetic body being in the magnetic field of said magnet and being magnetically coerced thereby, said magnet being strong enough to cause said auxiliary float to move by magnetic attraction abreast of said main float along said direction, and means for translating the variations in the position of said auxiliary float in said auxiliary tube automatically into corresponding variations in the characteristics of an electric current, and comprising an electric circuit for said electric current, said electric current including a conductor carried by said auxiliary float for movement therewith and in electrical communication with said still liquid, a fixed terminal in electrical communication with the still liquid and located beyond said conductor in position to cause the distance along said auxiliary tube and along said still liquid between said terminal and said conductor to vary as the auxiliary float moves along said auxiliary tube, said electric circuit also including said still liquid, a fixed conductor in the inside of the auxiliary tube in electrical communication with said still liquid and extending opposite said auxiliary float during its movement, said fixed conductor being separated from said movable conductor by said still liquid, the body of still liquid between said conductors and the body of still liquid between the movable conductor and said terminal constituting two circuit sections connected in series in said electric circuit, whereby variations in the characteristics of the electric current in said circuit is created by movements of the float in said still liquid.

5. A flow meter of the area type as described in claim 4, wherein said still liquid is electrically conductive to constitute a resistance in said circuit, whereby the resistance of said circuit varies as the position of the auxiliary float varies.

6. A flow meter of the area type as described in claim 4, wherein said still liquid is a dielectric and forms part of condenser means in said circuit, whereby the capacitance of said circuit varies as the position of the auxiliary float varies.

References Cited in the file of this patent

UNITED STATES PATENTS

| 2,433,577 | Poole | Dec. 30, 1947 |
| 2,452,156 | Schover | Oct. 26, 1948 |
| 2,556,346 | Stromberg | June 12, 1951 |

FOREIGN PATENTS

| 1,043,027 | France | June 10, 1953 |
| 304,890 | Germany | Apr. 15, 1918 |
| 814,943 | Germany | Sept. 27, 1951 |